United States Patent
Nakajima et al.

(10) Patent No.: US 10,834,314 B2
(45) Date of Patent: Nov. 10, 2020

(54) IMAGE SIGNAL PROCESSING DEVICE, DITHER PATTERN GENERATING METHOD, AND DITHER PATTERN GENERATING PROGRAM

(71) Applicant: JVCKENWOOD Corporation, Yokohama (JP)

(72) Inventors: Nobuki Nakajima, Yokohama (JP); Hideki Aiba, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/580,160

(22) Filed: Sep. 24, 2019

(65) Prior Publication Data

US 2020/0099857 A1    Mar. 26, 2020

(30) Foreign Application Priority Data

Sep. 25, 2018 (JP) .................................. 2018-178444
Sep. 25, 2018 (JP) .................................. 2018-178452

(51) Int. Cl.
*H04N 1/407* (2006.01)
*H04N 5/232* (2006.01)
*H04N 5/235* (2006.01)

(52) U.S. Cl.
CPC ......... *H04N 5/23232* (2013.01); *H04N 5/235* (2013.01); *H04N 1/4078* (2013.01)

(58) Field of Classification Search
CPC ... G09G 3/2055; G09G 3/2077; G09G 3/2803
See application file for complete search history.

(56) References Cited

U.S. PATENT DOCUMENTS

| | | | | |
|---|---|---|---|---|
| 6,288,698 B1 * | 9/2001 | Ishii | ..................... | G09G 3/3622 345/204 |
| 6,476,824 B1 * | 11/2002 | Suzuki | ................. | G09G 3/2055 345/690 |
| 7,692,665 B2 * | 4/2010 | Daly | .................... | G09G 3/2055 345/596 |
| 2019/0385507 A1 * | 12/2019 | Aiba | .................... | G09G 3/2077 |

FOREIGN PATENT DOCUMENTS

JP         2000-56726 A      2/2000

* cited by examiner

*Primary Examiner* — Antonio A Caschera
(74) *Attorney, Agent, or Firm* — Nath, Goldberg & Meyer; Jerald L. Meyer

(57) ABSTRACT

A storage device stores dither patterns composed of three-dimensional block consisting of the number H of dots in a horizontal direction×the number V of lines in a vertical direction×the number F of frame directions. Each value from a minimum value to a maximum value of dither values of n bits is written in each address of the storage device corresponding to each dot. When each value is written into the storage device, processing of obtaining a spatiotemporal density value indicating a degree of density of an address in which a dither value has already been written in a predetermined three-dimensional area centered on each of the addresses in which a new dither value is writable, and processing of selecting an address having the smallest spatiotemporal density value among the addresses in which a new dither value is writable and writing a dither value are repeated.

12 Claims, 10 Drawing Sheets

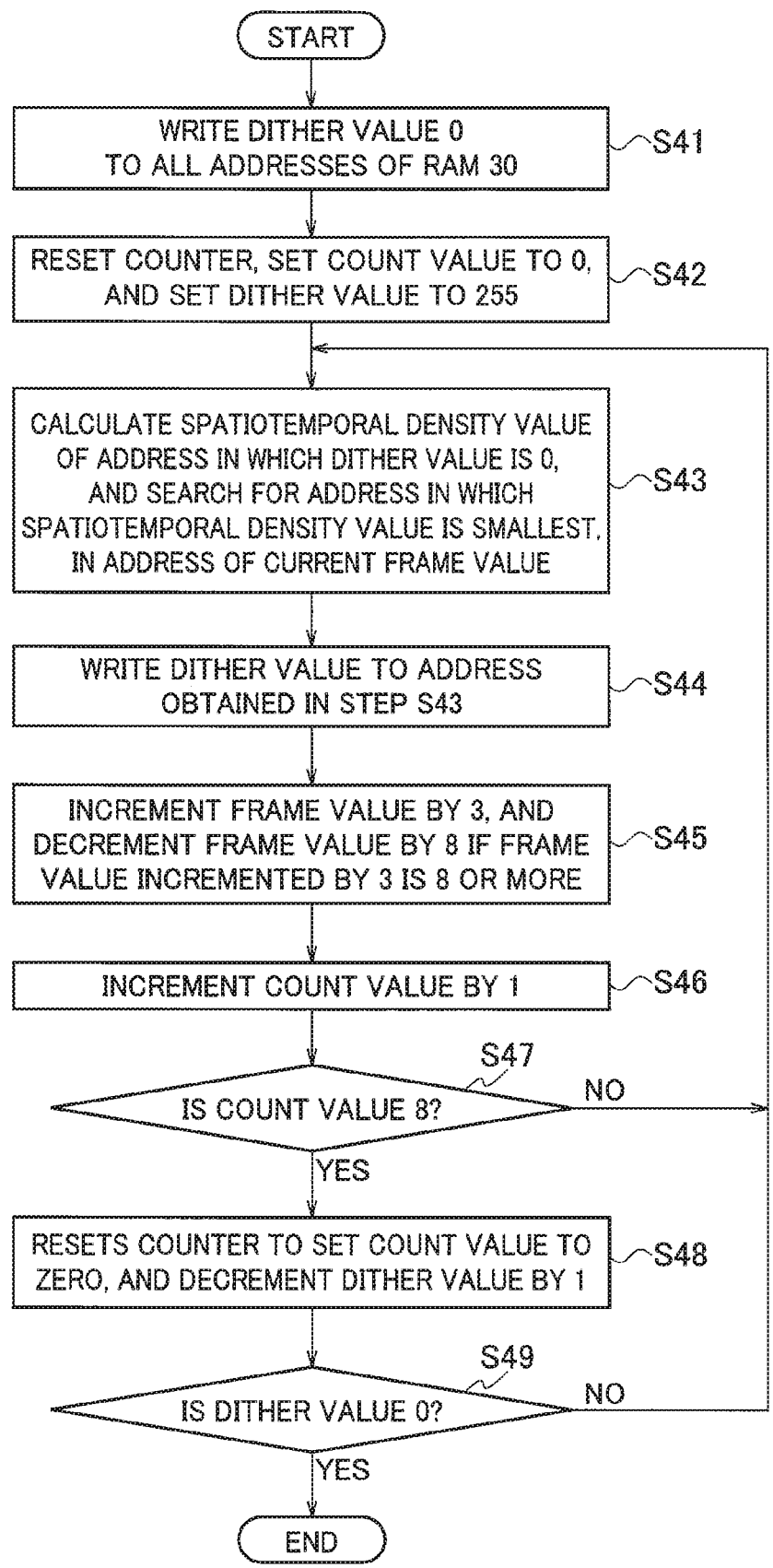

IMAGE SIGNAL PROCESSING DEVICE, DITHER PATTERN GENERATING METHOD, AND DITHER PATTERN GENERATING PROGRAM

CROSS REFERENCE TO RELATED APPLICATION

This application is based upon and claims the benefit of priority under 35 U.S.C. § 119 from Japanese Patent Application No. 2018-178444 filed on Sep. 25, 2018, and Japanese Patent Application No. 2018-178452 filed on Sep. 25, 2018, the entire contents of both of which are incorporated herein by reference.

BACKGROUND

The present disclosure relates to an image signal processing device, a dither pattern generating method, and a dither pattern generating program.

An image signal including a first number of gradations by (m+n) bits may be input to a display that is capable of expressing only a second number of gradations by m bits, where m and n are predetermined integers. In this case, the first number of gradations may be expressed in a pseudo manner by applying n-bit multi-gradation processing to an m-bit image signal. One of pseudo multi-gradation processing includes image signal processing called frame rate control (FRC) in which the number of bits is reduced after adding dither data having dither patterns repeating at a plurality of frame periods to an image signal.

SUMMARY

A typical image signal processing device adds different dither patterns of four dots of two horizontal dots and two vertical lines to an image signal at four frame periods, and performs pseudo multi-gradation processing on the image signal. According to the image signal processing device that adds dither data of the dither patterns of four dots at four frame periods, gradation of 2 bits may be expanded in a pseudo manner.

In order to increase the number of bits to be expanded greater than two bits, the size of a block of a dither pattern is set to be greater than four dots and a frame period of adding the dither data of different dither patterns is set to be longer than four frames. However, when dither data in which one block of a dither pattern is large and a frame period is long is added to an image signal, side effects tend to occur. Thus, a dither pattern that is less likely to cause side effects due to the addition of dither data and that is capable of expanding gradation with a high quality is required.

A first aspect of one or more embodiments provides an image signal processing device including: a storage device configured, when the number of dots in a horizontal direction is H, the number of lines in a vertical direction is V, and the number of frame directions is F, to store dither data having a three-dimensional dither pattern composed of a three-dimensional block in which two-dimensional dither patterns are arranged in the number F in the frame direction, in which the number of dots of H×V is a number exceeding 4, and each two-dimensional block consisting of the number of dots of H×V is set to be one two-dimensional dither pattern, in which a dither value that is one of n bits is set in each dot; an adder configured to add a selected dither pattern for each of the two-dimensional blocks consisting of the number of dots of H×V in a frame of an input image signal having a first number of bits, when the two-dimensional dither patterns in the number F in the frame direction are sequentially selected in a frame period F; and a lower bit reduction unit configured to perform limit processing on an overflow at an output of the adder, and to output an image signal having a second number of bits obtained by reducing the lower n bits of the first number of bits, wherein each value from a minimum value to a maximum value of dither values of n bits is written in each address of the storage device corresponding to each dot of the three-dimensional block consisting of the number of dots of H×V×F, and each value of the dither values of n bits is assigned to each dot of the three-dimensional block by repeating the following processing: a first processing of obtaining the number of written address or addresses in which a dither value has already been written in a predetermined three-dimensional area centered on each of target addresses in which a new dither value is writable, when each value of the dither values of n bits is written into the storage device; a second processing of obtaining a spatiotemporal density value indicating a degree of density of the written addresses in the predetermined three-dimensional area centered on each of the target addresses; a third processing of processing the target address to be less likely to be selected as an address having the smallest spatiotemporal density value, in accordance with the number of written address or addresses obtained by the first processing; a fourth processing of selecting an address having the smallest spatiotemporal density value among all of the target addresses after executing the third processing; and a fifth processing of writing a dither value to the target address selected as the address having the smallest spatiotemporal density value by the fourth processing.

A second aspect of one or more embodiments provides a dither pattern generating method of, when the number of dots in a horizontal direction is H, the number of lines in a vertical direction is V, and the number of frame directions is F, generating dither patterns composed of a three-dimensional block in which two-dimensional dither patterns are arranged in the number F in the frame direction, in which the number of dots of H×V is a number exceeding 4, and each two-dimensional block consisting of the number of dots of H×V is set to be one two-dimensional dither pattern, in which a dither value that is one of n bits is set in each dot, the dither pattern generating method including: obtaining the number of written address or addresses in which a dither value has already been written in a predetermined three-dimensional area centered on each of target addresses in which a new dither value is writable, of the addresses in a storage device corresponding to each dot of the three-dimensional block consisting of the number of dots of H×V×F; obtaining a spatiotemporal density value indicating a degree of density of the written addresses in the predetermined three-dimensional area centered on each of the target addresses; processing each target address to be less likely to be selected as an address having the smallest spatiotemporal density value, in accordance with the obtained number of written address or addresses; selecting an address having the smallest spatiotemporal density value among all the target addresses, after processing each target address to be less likely to be selected as an address having the smallest spatiotemporal density value; writing a dither value to the target address selected as the address having the smallest spatiotemporal density value; storing dither data having the three-dimensional dither pattern in the storage device, by writing each value from a minimum value to a maximum value of dither values of n bits in an arbitrary order in each address of the storage device corresponding to each dot of the three-dimensional block, by repeating the obtaining of the number of written address or addresses, the obtaining of the spatiotemporal density value, the processing of each target address to be less likely to be selected as an address having the smallest spatiotemporal density value, the selecting of an address having the smallest spatiotemporal density value, and the writing of a dither value to the target address selected as the address having the smallest spatiotemporal density value.

A third aspect of one or more embodiments provides a computer software product that includes a non-transitory storage medium readable by a processor, the non-transitory storage medium having stored thereon a set of instructions for generating dither patterns, when the number of dots in a horizontal direction is H, the number of lines in a vertical direction is V, and the number of frame directions is F, generating dither patterns composed of a three-dimensional block in which two-dimensional dither patterns are arranged in the number F in the frame direction, in which the number of dots of H×V is a number exceeding 4, and each two-dimensional block consisting of the number of dots of H×V is set to be one two-dimensional dither pattern, in which a dither value that is one of n bits is set in each dot, the instructions including: a first set of instructions of obtaining the number of written address or addresses in which a dither value has already been written in a predetermined three-dimensional area centered on each of target addresses in which a new dither value is writable, of the addresses in a storage device corresponding to each dot of the three-dimensional block consisting of the number of dots of H×V×F; a second set of instructions of obtaining a spatiotemporal density value indicating a degree of density of the written addresses in the predetermined three-dimensional area centered on each of the target addresses; a third set of instructions of processing each target address to be less likely to be selected as an address having the smallest spatiotemporal density value, in accordance with the number of written address or addresses obtained by the first set of instructions; a fourth set of instructions of selecting an address having the smallest spatiotemporal density value among all the target addresses after executing the third set of instructions; and a fifth set of instructions of writing a dither value to the target address selected as the address having the smallest spatiotemporal density value by the fourth set of instructions; and a sixth set of instructions of storing dither data having the three-dimensional dither pattern in the storage device, by writing each value from a minimum value to a maximum value of dither values of n bits in an arbitrary order in each address of the storage device corresponding to each dot of the three-dimensional block, by repeating the first to fifth sets of instructions.

A fourth aspect of one or more embodiments provides an image signal processing device including: a storage device configured, when the number of dots in a horizontal direction is H, the number of lines in a vertical direction is V, and the number of frame directions is F, to store dither data having a three-dimensional dither pattern composed of a three-dimensional block in which two-dimensional dither patterns are arranged in the number F in the frame direction, in which the number of dots of H×V is a number exceeding 4, and each two-dimensional block consisting of the number of dots of H×V is set to be one two-dimensional dither pattern, in which a dither value that is one of n bits is set in each dot; an adder configured to add a selected dither pattern for each of the two-dimensional blocks consisting of the number of dots of H×V in a frame of an input image signal having a first number of bits, when the two-dimensional dither patterns in the number F in the frame direction are sequentially selected in a frame period F; and a lower bit reduction unit configured to perform limit processing on an overflow at an output of the adder, and to output an image signal having a second number of bits obtained by reducing the lower n bits of the first number of bits, wherein each value from a minimum value to a maximum value of dither values of n bits is written in each address of the storage device corresponding to each dot of the three-dimensional block consisting of the number of dots of H×V×F, when each value of the dither values of n bits is written into the storage device, a processing of obtaining a spatiotemporal density value indicating a degree of density of written addresses in which a dither value has already been written in a predetermined three-dimensional area centered on each of target addresses in which a new dither value is writable, and a processing of selecting an address having the smallest spatiotemporal density value among the addresses in which a new dither value is writable and writing a dither value are executed for each two-dimensional block of the three-dimensional block, each value of the dither values of n bits is assigned to each dot of the three-dimensional block by circulating a two-dimensional block in which the processing of obtaining a spatiotemporal density value and the processing of selecting an address having the smallest spatiotemporal density value and writing a dither value are executed, in the frame direction in an arbitrary order.

A fifth aspect of one or more embodiments provides a dither pattern generating method of, when the number of dots in a horizontal direction is H, the number of lines in a vertical direction is V, and the number of frame directions is F, generating dither patterns composed of a three-dimensional block in which two-dimensional dither patterns are arranged in the number F in the frame direction, in which the number of dots of H×V is a number exceeding 4, and each two-dimensional block consisting of the number of dots of H×V is set to be one two-dimensional dither pattern, in which a dither value that is one of n bits is set in each dot, the dither pattern generating method including: obtaining a spatiotemporal density value indicating a degree of density of written addresses in which a dither value has already been written in a predetermined three-dimensional area centered on each of target addresses in which a new dither value is writable, for each two-dimensional block of the three-dimensional block; selecting an address having the smallest spatiotemporal density value among the addresses in which a new dither value is writable, and writing a dither value to the selected address, for each two-dimensional block of the three-dimensional block; storing dither data having the three-dimensional dither pattern in the storage device, by writing each value from a minimum value to a maximum value of dither values of n bits in an arbitrary order in each address of the storage device corresponding to each dot of the three-dimensional block, by circulating a two-dimensional block in which the processing of obtaining a spatiotemporal density value and the processing of selecting an address having the smallest spatiotemporal density value and writing a dither value are executed, in the frame direction in an arbitrary order.

A sixth aspect of one or more embodiments provides a computer software product that includes a non-transitory storage medium readable by a processor, the non-transitory storage medium having stored thereon a set of instructions for generating dither patterns, when the number of dots in a horizontal direction is H, the number of lines in a vertical direction is V, and the number of frame directions is F, generating dither patterns composed of a three-dimensional block in which two-dimensional dither patterns are arranged in the number F in the frame direction, in which the number of dots of H×V is a number exceeding 4, and each two-dimensional block consisting of the number of dots of H×V is set to be one two-dimensional dither pattern, in which a dither value that is one of n bits is set in each dot, the instructions including: a first set of instructions of obtaining a spatiotemporal density value indicating a degree of density of written addresses in which a dither value has already been written in a predetermined three-dimensional area centered on each of target addresses in which a new dither value is writable, for each two-dimensional block of the three-dimensional block; a second set of instructions of selecting an address having the smallest spatiotemporal density value among the addresses in which a new dither value is writable, and writing a dither value to the selected address, for each two-dimensional block of the three-dimensional block; a third set of instructions of storing dither data having the three-dimensional dither pattern in the storage device, by writing each value from a minimum value to a maximum value of dither values of n bits in an arbitrary order in each address of the storage device corresponding to each dot of the three-dimensional block, by circulating a two-dimensional block in which the processing of obtaining a spatiotemporal density value and the processing of selecting an address having the smallest spatiotemporal density value and writing a dither value are executed, in the frame direction in an arbitrary order.

BRIEF DESCRIPTION OF THE DRAWINGS

FIG. 10 is a flowchart illustrating processes executed via a dither pattern generating method or a dither pattern generating program according to a fourth embodiment.

DETAILED DESCRIPTION

Hereinafter, an image signal processing device, a dither pattern generating method, and a dither pattern generating program according to each embodiment will be described with reference to the accompanying drawings. The configuration of the image signal processing device according to each embodiment is common. The configuration and operation of the image signal processing device common to each embodiment will be described with reference to FIG. 1.

Figure 1:
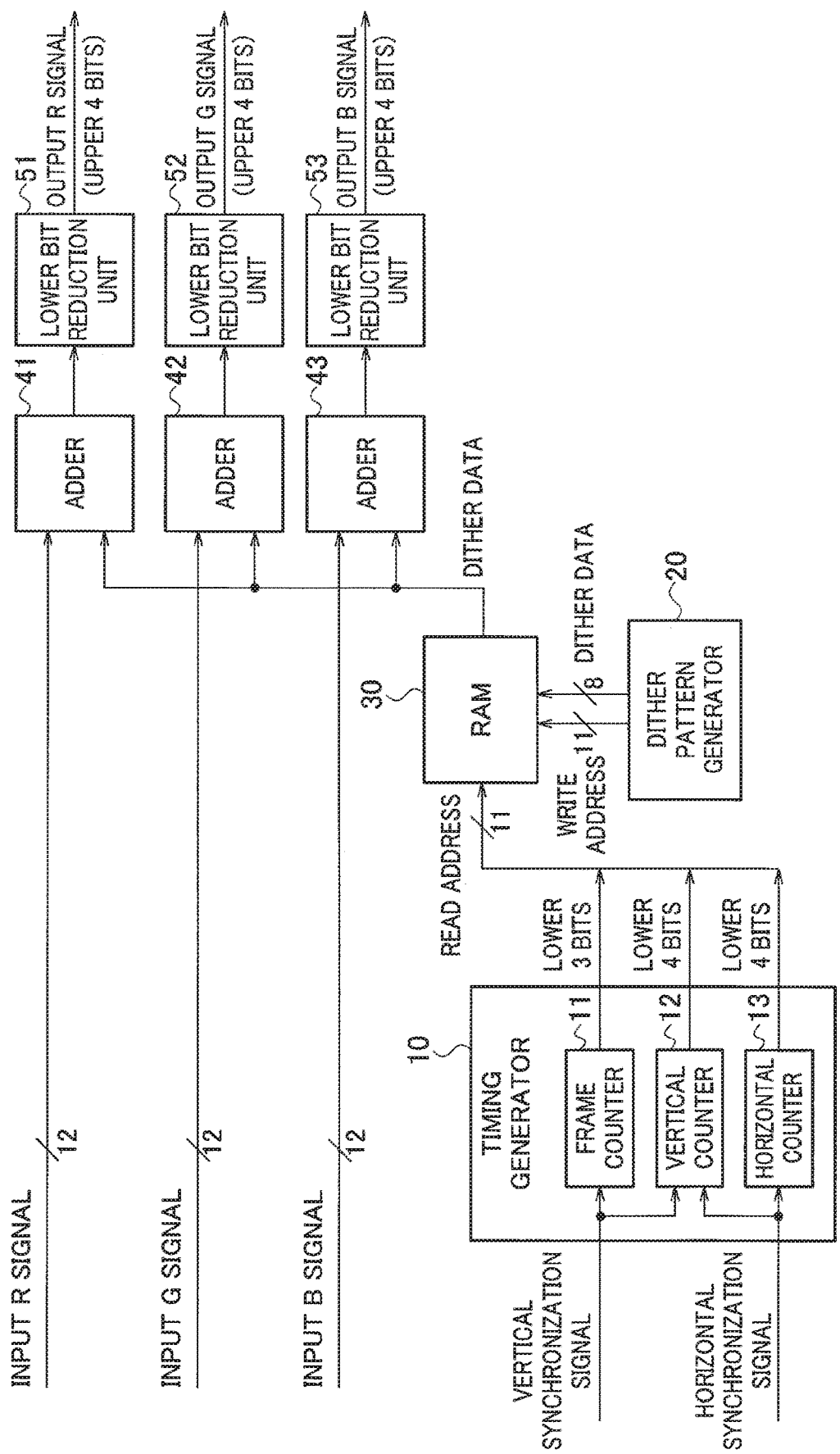
FIG. 1 is a block diagram illustrating an image signal processing device according to each embodiment.

In FIG. 1, an image signal processing device according to each embodiment includes a timing generator 10, a dither pattern generator 20, a random access memory (RAM) 30, adders 41 through 43, and lower bit reduction units 51 through 53. As an example, input signals input to the image signal processing device are an R signal, a G signal, and a B signal of 12 bits. The image signal processing device according to each embodiment outputs an R signal, a G signal, and a B signal of 4 bits by reducing the lower 8 bits after adding a dither pattern described later to the R signal, the G signal, and the B signal.

The timing generator 10 includes a frame counter 11 configured to count frames based on a vertical synchronization signal, a vertical counter configured to count the number of lines in a vertical direction based on the vertical synchronization signal and a horizontal synchronization signal, and a horizontal counter 13 configured to count the number of dots in a horizontal direction based on the horizontal synchronization signal. Note that the vertical counter 12 resets a count value with the vertical synchronization signal and counts up using the horizontal synchronization signal as a trigger.

A read address of 11 bits, in which the lower 3 bits of a frame count value generated by the frame counter 11, the lower 4 bits of a vertical count value generated by the vertical counter 12, and the lower 4 bits of a horizontal count value generated by the horizontal counter 13 are combined, is supplied to the RAM 30. The RAM 30 is an example of a storage device.

The dither pattern generator 20 executes a dither pattern generating method according to each embodiment to generate a dither pattern. The dither pattern generator 20 may be a central processing unit (CPU) or a computer that executes a dither pattern generating program according to each embodiment to generate a dither pattern.

Figure 2:
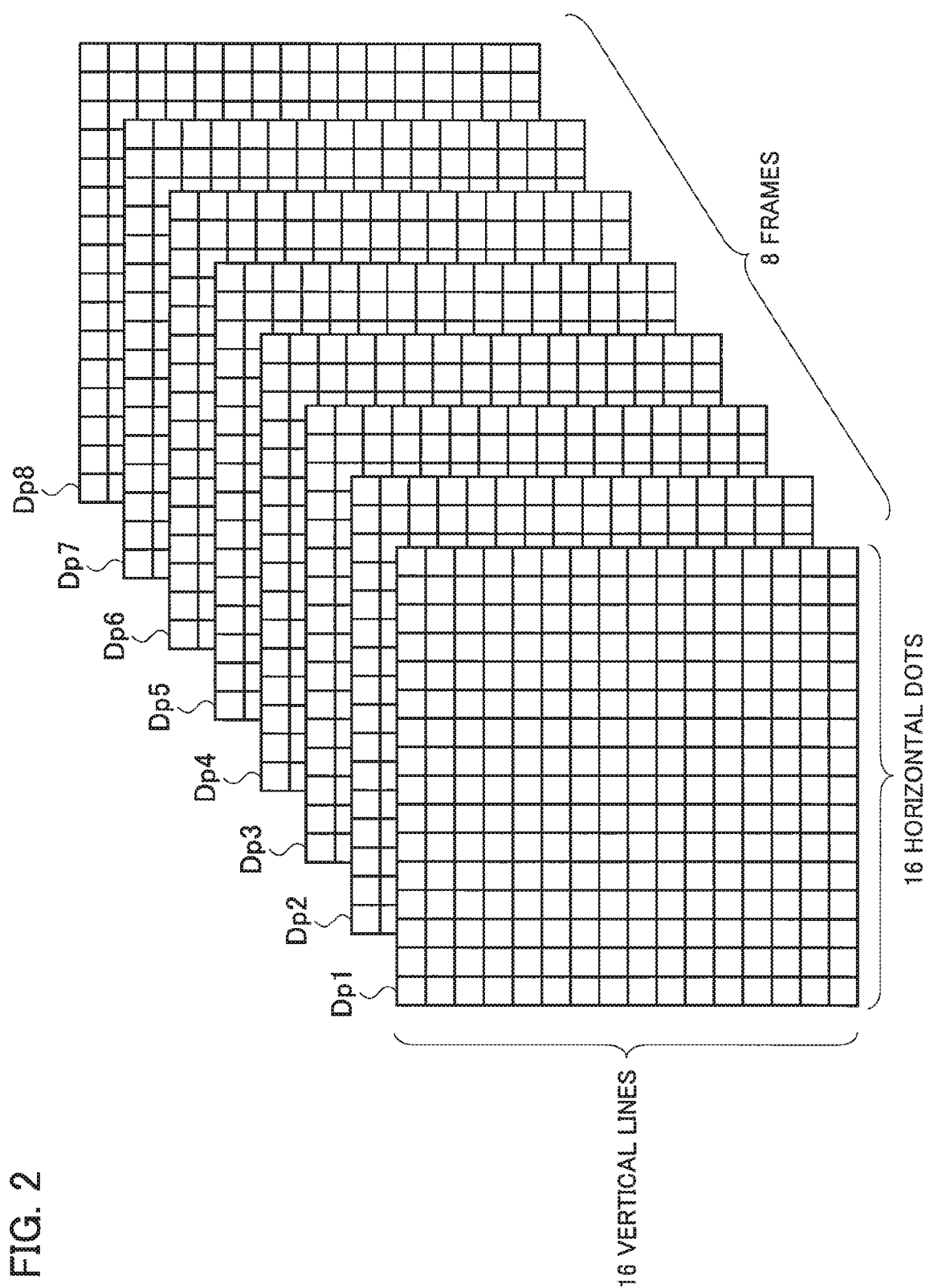
FIG. 2 is a diagram illustrating an example of dither patterns of eight frame periods.

As illustrated in FIG. 2, the dither pattern generator 20 generates dither patterns of eight frame periods consisting of 256 dots of 16 horizontal dots and 16 vertical lines, for example. The dither patterns of eight frame periods will be referred to as dither patterns Dp1 through Dp8. The dither patterns Dp1 through Dp8 have different dither patterns. The dither patterns Dp1 through Dp8 formed of two-dimensional blocks are arranged in the frame direction, and a dither pattern composed of a three-dimensional block is formed by the entire dither patterns Dp1 through Dp8.

Each dot of the dither patterns Dp1 through Dp8 may be specified by 2048 addresses expressible by 11 bits. In this regard, the dither pattern generator 20 generates a write address of 11 bits and supplies the write address to the RAM 30. In each embodiment, the number of extended bits is 8 to reduce an image signal of 12 bits to 4 bits. Thus, the dither pattern generator 20 generates dither data in which a dither value of 8 bits is assigned to each dot of the dither patterns Dp1 through Dp8. That is, the dither value of each dot is any value from 0 to 255.

The RAM 30 includes 2048 addresses and the 2048 addresses correspond to each dot of the three-dimensional block consisting of the dither patterns Dp1 through Dp8. The dither pattern generator 20 generates the dither value of each dot of the dither patterns Dp1 through Dp8, and writes the respective dither value in an address specified by the write address. Accordingly, the RAM 30 stores the dither data having the dither patterns Dp1 through Dp8 in which the dither value is assigned to each dot.

When the image signal processing device is activated, the dither pattern generator 20 generates the dither data having the dither patterns Dp1 through Dp8, and writes the dither data into the RAM 30. The dither data stored in the RAM 30 is read by the read address of ii bits and supplied to the adders 41 through 43.

In FIG. 1, a RAM is used as a storage device for storing the dither data having the dither patterns Dp1 through Dp8, but a read-only memory (ROM) in which the dither patterns Dp1 through Dp8 generated by the dither pattern generator 20 are written in advance may be used. A type of storage device is not limited. When a ROM is used as a storage device, the dither pattern generator 20 is provided outside the image signal processing device.

The adders 41 through 43 add the dither data of 8 bits to the input R signal, G signal, and B signal of 12 bits. A dither pattern of the dither data added to the R signal, G signal, and B signal is sequentially selected from the dither patterns Dp1 through Dp8 by the read address. The adders 41 through 43 add the dither data of the selected dither pattern for each block by setting 256 dots of 16 horizontal dots and 16 vertical lines in each frame as one block.

The lower bit reduction units 51 through 53 perform limit processing on overflows of outputs of the adders 41 through 43, respectively, and output the R signal, G signal, and B signal of upper 4 bits by reducing the lower 8 bits.

For example, the lower 8 bits of the R signal, G signal, and B signal of 12 bits may be 128 and the added dither data may be any one of 0 to 127. In this case, since addition results by the adders 41 through 43 are 255 or less, the addition results do not move up to the upper bits. The lower bits of the R signal, G signal, and B signal of 12 bits may be 128 and the added dither data may be any one of 128 to 255. In this case, since the addition results by the adders 41 through 43 are 256 or more, the addition results move up to the upper bits.

When the frequency of the dither values 0 to 255 of the dither data is uniform, a probability of not being moved up to the upper bits and a probability of being moved up to the upper bits are half and half. Accordingly, a probability that the lower bit reduction units 51 through 53 outputs the original upper 4 bits of the input R signal, G signal, and B signal after reducing 128 of the lower 8 bits, and a probability of outputting the upper 4 bits to which +1 is added are half and half. Consequently, 0.5 is expressed on average.

In the above description, the lower 8 bits are 128, but since the lower 8 bits are any one of 0 to 255, the lower 8 bits are as follows considering all of 0 to 255. Dither data having a dither value of 0 to 255 is added to 0 to 255 of the lower 8 bits of the R signal, G signal, and B signal of 12 bits, and the frequency of the lower 8 bits moving to the upper bit becomes one of 0/256 to 255/256. That is, bit expansion of 8 bits is enabled via processing of the adders 41 through 43 and the lower bit reduction units 51 through 53.

The R signal, G signal, and B signal output from the lower bit reduction units 51 through 53 are 4 bits, but the number of gradations of 12 bits is expressed in a pseudo manner according to the bit expansion of 8 bits.

Next, what patterns of the dither patterns Dp1 through Dp8 are required to avoid side effects caused by addition of the dither data and to expand the gradation with a high quality will be described.

Conditions required for the dither patterns Dp1 through Dp8 include: Condition 1 in which dither values 0 through 255 are distributed as uniformly as possible within one dither pattern; and Condition 2 in which dither values in a frame direction respectively at positions of the dither patterns Dp1 through Dp8 are distributed as much as possible.

More preferable conditions include, in addition to Conditions 1 and 2: Condition 3 in which a boundary of blocks is not visible within frames of the R signal, G signal, and B signal to which a dither pattern is added and thus there is almost no visual discomfort at the boundary of blocks; and Condition 4 in which a boundary of frame periods of dither patterns is unlikely visible in a frame direction of the R signal, G signal, and B signal to which three-dimensional block composed of the dither patterns Dp1 through Dp8 are added, and periodicity in the frame direction (specifically, flicker disturbance) is unlikely recognized.

Figure 3:
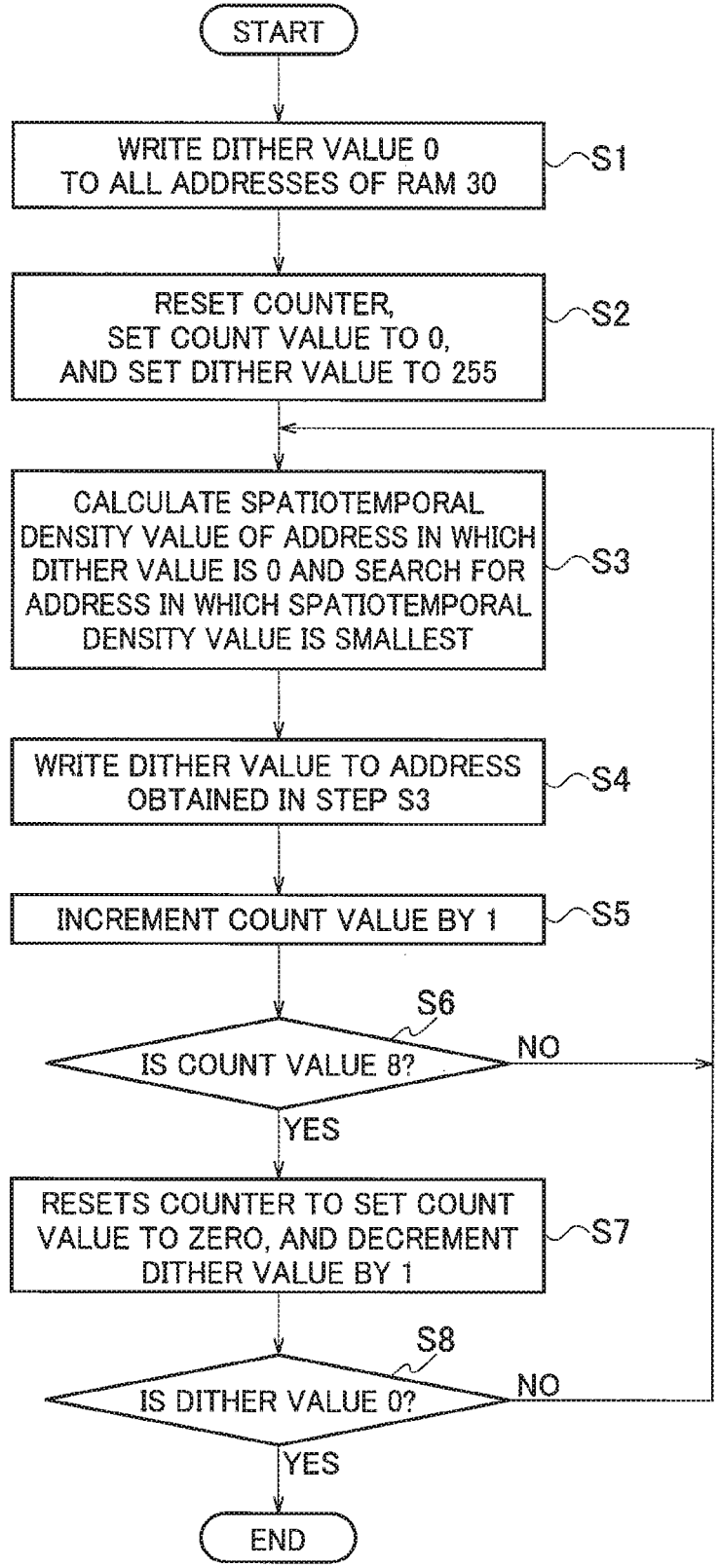
FIG. 3 is a flowchart illustrating processes that are premises of processes executed via a dither pattern generating method or dither pattern generating program according to each embodiment.
Figure 4:
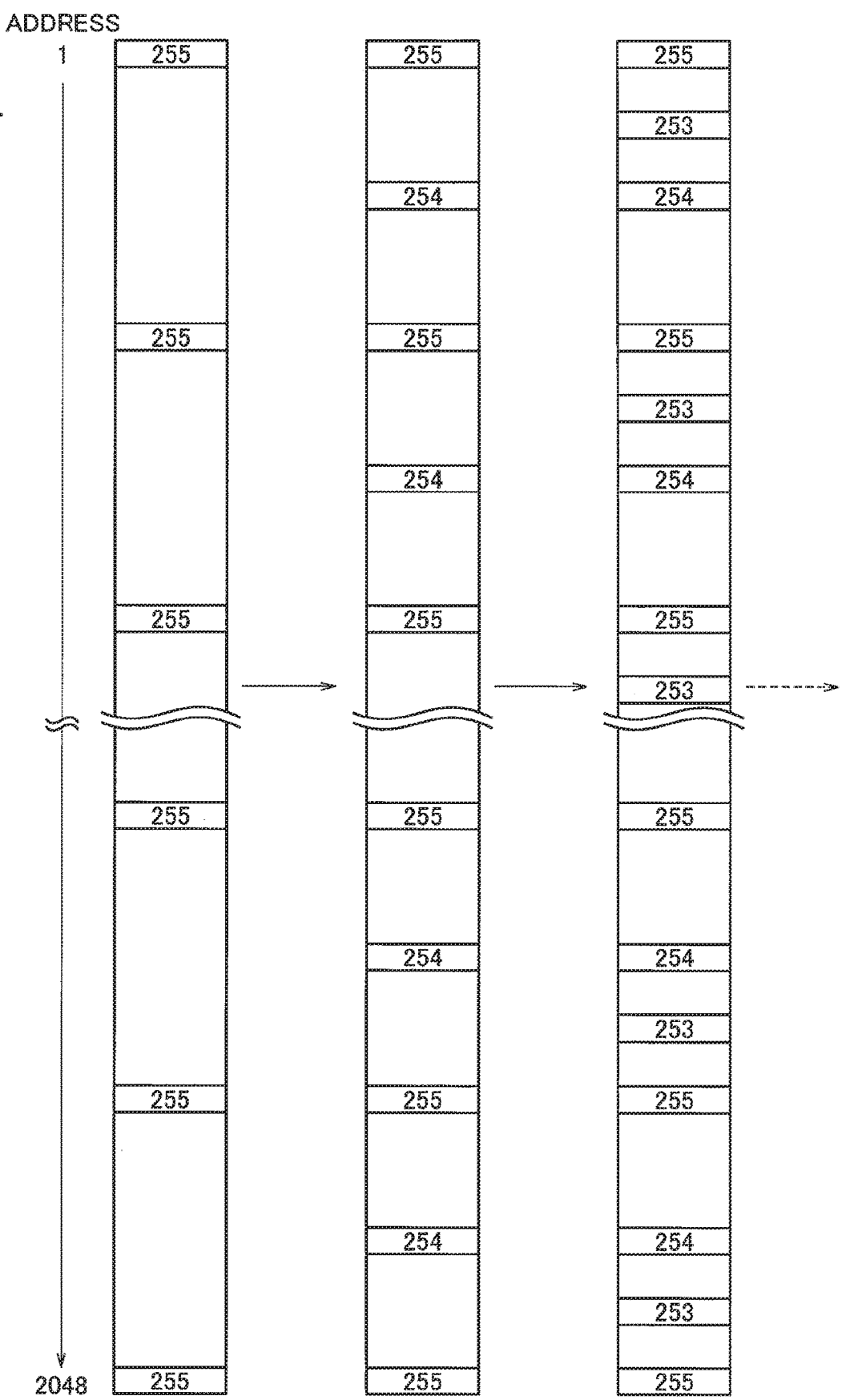
FIG. 4 is a diagram conceptually illustrating processes of sequentially writing dither values to addresses having the smallest spatiotemporal density value in a storage device.

A specific generating method for generating the dither patterns Dp1 through Dp8 so that at least Conditions 1 and 2 are satisfied will be described with reference to FIGS. 3 and 4. FIGS. 3 and 4 illustrate processes that are premises of processes executed via a dither pattern generating method or a dither pattern generating program according to each embodiment.

In FIG. 3, the dither pattern generator 20 writes a dither value 0 to all 2048 addresses of the RAM 30 in step S1. The dither pattern generator 20 resets a counter to set a count value to 0, and sets a dither value to 255 in step S2. The dither pattern generator 20 calculates a spatiotemporal density value of each address in which a dither value is 0 and searches for an address having the smallest spatiotemporal density value in step S3.

The spatiotemporal density value is a value indicating a degree of density of an address in which a dither value has already been written in a predetermined three-dimensional area centered on each of the addresses in which a dither value is newly writable, when a dither value is to be newly written in the address of the RAM 30. Hereinafter, an address in which a dither value has already been written is referred to as a written address. Details about the spatiotemporal density value will be described later. The address in which a dither value is newly writable is an address in which the dither value 0 is written. In the example illustrated in FIG. 3, since the dither value 0 has already been written in all addresses of the RAM 30, at first, it is possible to write dither values to all of the addresses, and dither values are sequentially written by repeating the following steps.

The dither pattern generator 20 writes the dither value into the address of the RAM 30 obtained via step S3 in step S4. In step S4, 255 is first written as the dither value. The dither pattern generator 20 increments a count value by 1 in step S5, and determines whether the count value is 8 in step S6. If the count value is not 8 (NO), the dither pattern generator 20 repeats processes of steps S3 through S6. That is, the dither value 255 is written in the RAM 30 in eight addresses sequentially obtained in step S3.

If the count value is 8 in step S6 (YES), the dither pattern generator 20 resets the counter to set the count value to zero, and decrements the dither value by 1 in step S7. The dither pattern generator 20 determines whether the dither value is 0 in step S8. If the dither value is not 0 (NO), the dither pattern generator 20 repeats the processes of steps S3 through S8.

That is, into the RAM 30, the dither value 254 is written eight times, then the dither value 253 is written eight times, and as such, processing of writing the dither value is repeated until the dither value 1 is written eight times. Thus, dither data having dither patterns composed of a three-dimensional block is stored in the RAM 30.

Since the dither value is written in advance, if the dither value is 0 in step S8 (YES), the dither pattern generator 20 ends the processing.

Through the above processing, each value of dither values 0 to 255 is written eight times to the 2048 addresses of the RAM 30. Since the number of addresses of the RAM 30 is 2048 and the number of extension bits is 8 bits, each value of the dither values 0 to 255 is written eight times (2048/256) so as to be uniformly assigned to the 2048 addresses.

FIG. 4 conceptually illustrates processes of sequentially writing dither values to addresses having the smallest spatiotemporal density value. In FIG. 4, the 2048 addresses of the RAM 30 are illustrated in a single dimension. By selecting the address having the smallest spatiotemporal density value, an address is selected from an area in a three-dimensionally coarse state in which a written address is not present as much as possible, and a new dither value is written.

In FIG. 4, first, eight dither values 255 are written in the RAM 30. Since the eight dither values 255 are written by sequentially selecting the addresses having the smallest spatiotemporal density value among the 2048 addresses, the eight dither values 255 are uniformly distributed within one dither pattern and in the frame direction. Note that, in FIG. 4, the dither value 0 is written in addresses of a blank portion.

Next, the eight dither values 254 are written in the RAM 30. Similarly, the eight dither values 254 are written by sequentially selecting the addresses having the smallest spatiotemporal density value among the remaining 2040 addresses, the eight dither values 254 are almost uniformly distributed within one dither pattern and in the frame direction.

Similarly thereafter, each dither value from the dither value 253 to the dither value 1 is written by sequentially selecting the addresses having the smallest spatiotemporal density value, among addresses in which a dither value is 0 and a new dither value is writable. According to such processing, Conditions 1 and 2 are achieved.

As a comparative example, it is conceivable to randomly select an address to which a dither value is to be written by using a pseudo random number generated by a pseudo random number generator. However, the pseudo random number generator may continuously generate an adjacent address or neighboring address, and thus Conditions 1 and 2 are unable to be achieved.

In the example illustrated in FIG. 3, the dither value 0 is written in all 2048 addresses of the RAM 30 in step S1 and each value from the dither value 255 to the dither value 1 is written in a descending order, but this is only an example of the processing. An order of writing each value from the minimum value to the maximum value of the dither value of 8 bits in the address of the RAM 30 is arbitrary.

A preferable calculating method of a spatiotemporal density value for achieving Conditions 3 and 4 will be described. The address of the RAM 30 is represented by (f, v, h). f indicates a position of a frame of the dither patterns Dp1 through Dp8 and f=0 to 7. v indicates a line position of 16 vertical lines and v=0 to 15. h indicates a dot position of 16 horizontal dots and h=0 to 15.

The dither pattern generator 20 performs filtering processing by a three-dimensional low pass filter (hereinafter, a three-dimensional LPF) with data of written address other than a dither value 0 being 1 and data of another address being 0. The LPF is a Gaussian filter, for example. Specifically, the dither pattern generator 20 performs a three-dimensional convolution operation on a kernel function of a three-dimensional LPF and data of an address, based on Equation 1 to calculate the spatiotemporal density value D (f, v, h).

$$D(f,v,h)=\Sigma_{i=-4}^{4}\Sigma_{j=-8}^{8}\Sigma_{k=-8}^{8}K(i,j,k)\cdot Q(\mathrm{mod}((f+i+8),8),\\ \mathrm{mod}((v+j+16),16),\mathrm{mod}((h+k+16),16)) \quad (1)$$

In Equation 1, K (i, j, k) denotes the kernel function of the three-dimensional LPF. i, j, and k are values for respectively determining a range of a frame direction, a range of a vertical direction, and a range of a horizontal direction of a three-dimensional area centered on an address (f, v, h) at which the spatiotemporal density value D(f, v, h) is to be calculated. For example, i=−4 to 4, j=−8 to 8, and k=−8 to 8, and the three-dimensional area may be a predetermined area.

The kernel function K (i, j, k) when a Gaussian filter is used as the three-dimensional LPF is represented by Equation 2. In Equation 2, σ denotes a standard deviation and a specific value may be a design value.

$$K(i,j,k) = \frac{1}{2\pi\sigma^2}\exp\left(-\frac{i^2+j^2+k^2}{2\sigma^2}\right) \quad (2)$$

Each block of the dither patterns Dp1 through Dp8 is repeatedly used in the frame and the three-dimensional block of the dither patterns Dp1 through Dp8 is repeatedly used in the frame direction. The remainder by b of a is expressed as mod (a, b). Therefore, mod (f+i+8, 8) indicates a first remainder when (f+i+8) is divided by 8 that is a frame period of a dither pattern, mod (v+i+16, 16) indicates a second remainder when (v+i+16) is divided by 16 that is a period (number of lines) in a vertical direction, and mod (h+i+16, 16) indicates a third remainder when (h+i+16) is divided by 16 that is a period (number of dots) in a horizontal direction.

Q (f, v, h) is a function (hereinafter, referred to as a function Q) that return 1 when a dither value other than a dither value 0 is written in the address (f, v, h) and returns 0 when the address (f, v, h) is in an initial value of the dither value 0. An address obtainable by mod (f+i+8, 8), mod (v+j+16, 16), and mod (h+k+16, 16) is referred to as (f', v', h').

Hence, Q (mod (f+i+8, 8), mod (v+j+16, 16), and mod (h+k+16, 16)) in Equation 1 indicate that 1 is returned when a dither value other than the dither value 0 is written in the address (f', v', h') and 0 is returned when the dither value 0 is written therein.

As such, when the spatiotemporal density value D (f, v, h) is calculated in each address, 1 or 0 is assigned to each of addresses obtained via a remainder operation using values of (f+i+8), (v+j+16), and (h+k+16) respectively as a frame period, the number of lines, and the number of dots of dither patterns. Then, the kernel function K (i, j, k) of three-dimensional LPF may be multiplied to 1 or 0 of each address to obtain the spatiotemporal density value D (f, v, h). In step S3 of FIG. 3, an address having the smallest spatiotemporal density value D (f, v, h) is searched for.

When an address having the smallest spatiotemporal density value is searched for and a dither value is written without using the remainder operation, the addresses of the upper, lower, left, and right end portions within the frame are likely to be selected as the address having the smallest spatiotemporal density value. Moreover, in the frame direction, the addresses located in the dither pattern Dp1 or Dp8, which is the end portion in the frame direction, are likely to be selected as the address having the smallest spatiotemporal density value.

In this case, a boundary of blocks in the frame becomes visible and a visual discomfort is likely to occur at the boundary of blocks. In addition, a boundary of a frame period of a three-dimensional block composed of the dither patterns Dp1 through Dp8 becomes visible and thus is easily recognized as flicker disturbance.

By using the remainder operation in the function Q, it is possible to avoid the addresses of the top, bottom, left, and right end portions in the dither pattern from being easily selected as the address having the smallest spatiotemporal density value. In addition, it is possible to avoid the address located in the dither pattern at the end portion in the frame direction from being easily selected as the address having the smallest spatiotemporal density value. Accordingly, Conditions 3 and 4 are achieved.

Meanwhile, i, j, and k that determines a three-dimensional area in which the kernel function K (i, j, k) is multiplied to 1 or 0 obtained by the function Q are generalized to i=−p to p, j=−q to q, and k=−r to r. p, q, and r are predetermined numbers. The number of frame directions (frame period) of a dither pattern is generalized to F, the number of lines in a vertical direction is generalized to V, and the number of dots in a horizontal direction is generalized to H. F, V, and H are predetermined numbers. Via such generalization, Equation 1 may be expressed by Equation 3.

$$D(f,v,h)=\Sigma_{i=-p}^{p}\Sigma_{j=-q}^{q}\Sigma_{k=-r}^{r}K(i,j,k)\cdot Q(\mathrm{mod}((f+i+F),F),\mathrm{mod}((v+j+V),V),\mathrm{mod}((h+k+H),H)) \quad (3)$$

In each embodiment described above, the number H of dots in the horizontal direction of the three-dimensional block of the dither pattern is set to 16, the number V of lines in the vertical direction is set to 16, and the number F of frame directions is set to 8, but are not limited thereto. The number of dots of H×V of one dither pattern is greater than 4. It has been confirmed by verification of the inventor that multi-gradation with less side effects and very high equality is realized not only when H=16 and V=16, but also when H=32 and V=32.

It has been experimentally confirmed that the number F of frame directions may be 4 to 8 when a frame rate of an image signal is 50 to 60 frames per second (fps) and 8 to 16 when the frame rate is 100 to 120 fps. The dither pattern generator 20 may be configured such as to change the number F of frame directions based on the frame rate of the image signal. When the image signal processing device illustrated in FIG. 1 is used as a display device capable of changing a frame rate when an image signal is displayed, the dither pattern generator 20 may change the number F of frame directions based on the frame rate.

When a storage device is configured as a ROM, dither data of the number F of frame directions corresponding to a plurality of frame rates may be stored in the ROM, or a plurality of ROMs in which dither data of the number F of frame directions corresponding to each frame rate is stored may be provided.

When H=16, V=16, F=8, and the number n of bits (number of extension bits) of a dither value is 8, the capacity of RAM 30 may be 2048×8 bits. When H=32, V=32, F=8, and n=8, the capacity of RAM 30 may be 8192×8 bits. In either case, the capacity of RAM 30 is relatively small.

When H=32, V=32, F=8, and n=8, each value of the dither values 0 to 255 is written 32 times from 8192/256 in 8192 addresses of the RAM 30. In step S6 of FIG. 3, it is determined whether the count value is 32.

By the processes shown in FIG. 3 described above, each dither value is almost uniformly distributed and written in the RAM 30 in one dither pattern and in the frame direction. However, in practice, the same dither value may be written to vertically or horizontally adjacent addresses in one dither pattern. Also, the same dither value may be written to adjacent addresses in the frame direction.

Next, the processes of each embodiment will be described, which can reduce the probability that the same dither value will be written to addresses adjacent in one dither pattern or in the frame direction, and can distribute each dither value more uniformly in one dither pattern or in the frame direction.

First Embodiment

Figure 5:
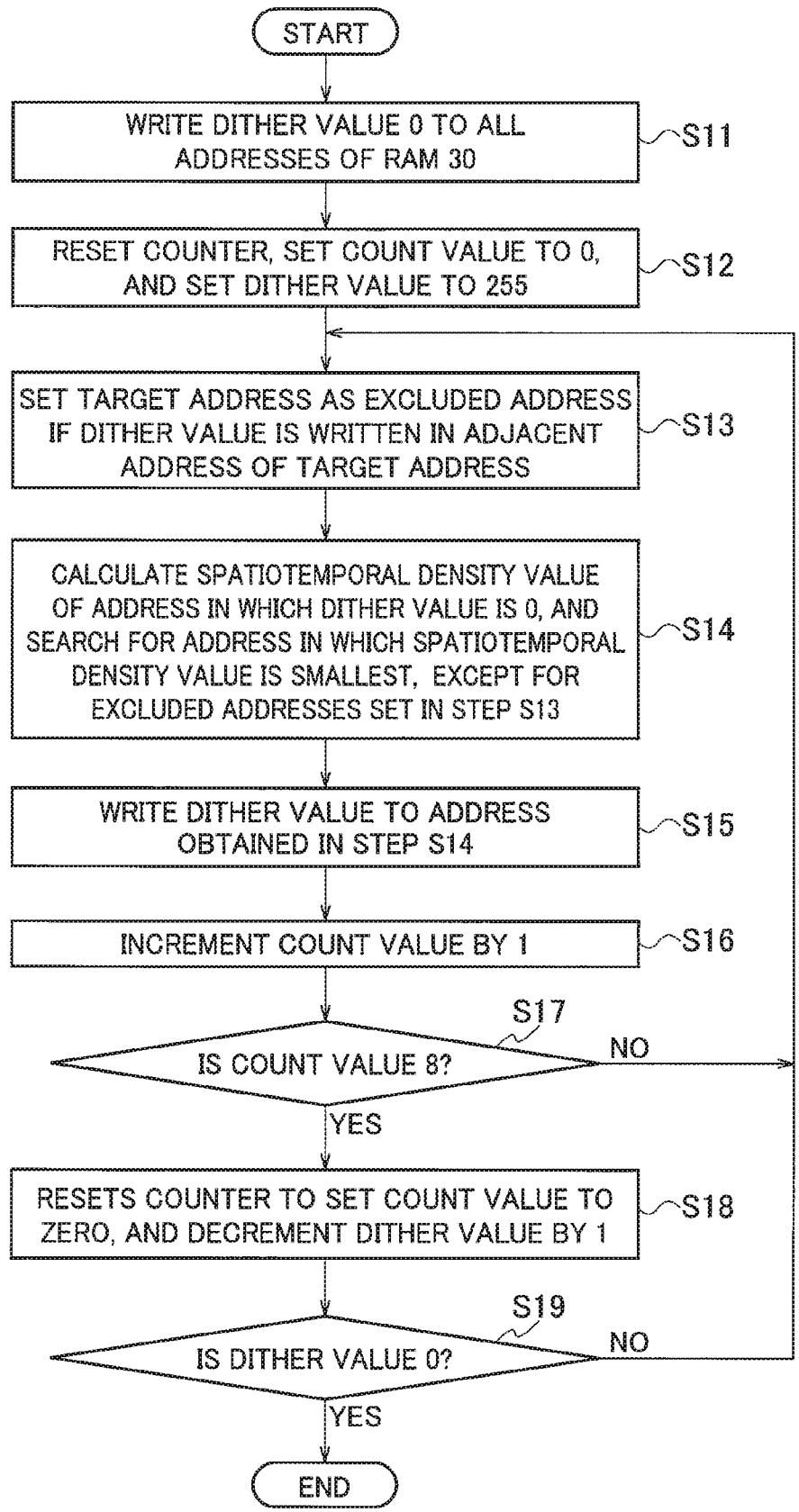
FIG. 5 is a flowchart illustrating processes executed via a dither pattern generating method or a dither pattern generating program according to a first embodiment.

FIG. 5 illustrates processes in which the dither pattern generator 20 generates the dither patterns executing a dither pattern generating method or a dither pattern generating program according to a first embodiment.

In FIG. 5, the dither pattern generator 20 writes a dither value 0 to all 2048 addresses of the RAM 30 in step S11. The dither pattern generator 20 resets a counter to set a count value to 0, and sets a dither value to 255 in step S12.

In step S13, the dither pattern generator 20 sequentially sets each address of 2048 addresses in the RAM 30 as a target address, and sets the target address as the excluded address, if a dither value other than the dither value 0 is written in the adjacent address of each target address.

Figure 6:
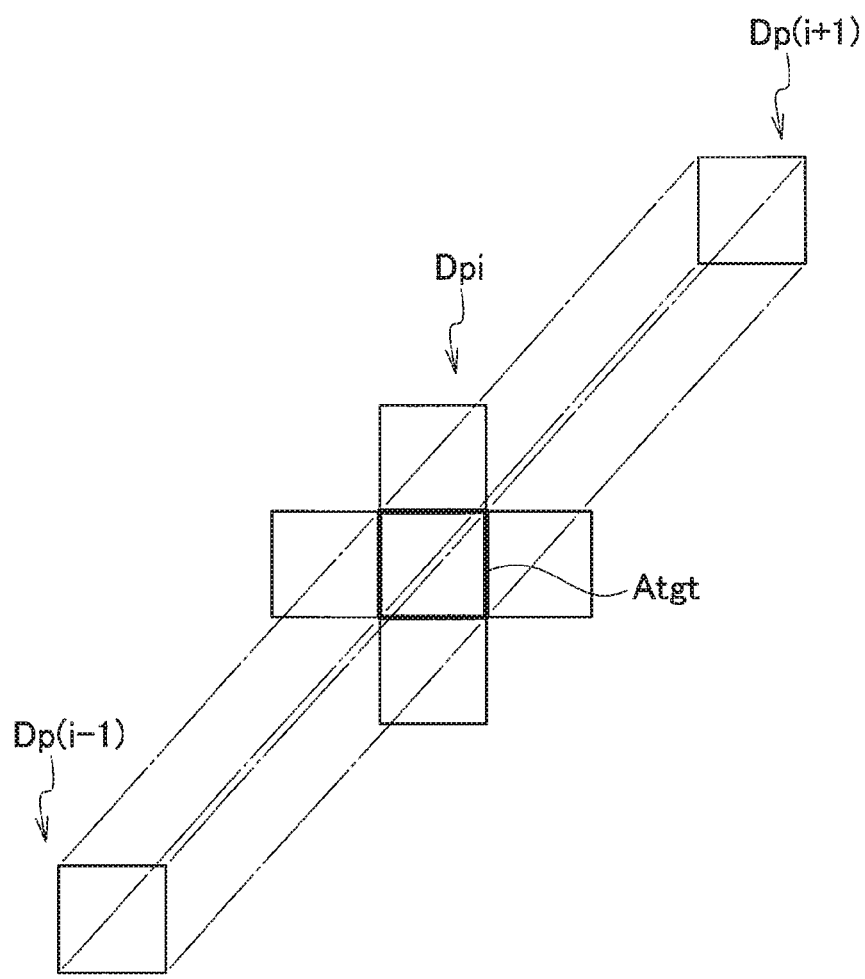
FIG. 6 is a diagram illustrating an example of a three-dimensional area centered on a target address in first and second embodiments.

As shown in FIG. 6, the adjacent address of the target address is an address located to the left, right, above, or below the target address in each of the dither patterns Dp1 to Dp8, or an address before or after adjacent to the frame direction. In FIG. 6, an address Atgt surrounded by a thick solid line is an arbitrary target address located in a dither pattern Dpi which is any one of the dither patterns Dp1 to Dp8. The left, right, above, below, before, and after addresses of the target address Atgt shown in FIG. 6 constitute a predetermined three-dimensional area centered on the target address Atgt.

The dither pattern generator 20 preferably changes the conditions for setting the target address as the excluded address according to the number of written address or addresses. As an example, when the number of written address or addresses is equal to or smaller than ⅛ of all addresses, the dither pattern generator 20 sets the target address as the excluded address, if a dither value other than the dither value 0 is written even in one of the addresses located to the left, right, above, below, before, and after the target address.

In addition, when the number of written addresses is greater than ⅛ and equal to or smaller than ¼ of all addresses, the dither pattern generator 20 sets the target address as the excluded address, if a dither value other than the dither value 0 is written in at least one set of addresses located to the left and right, above and below, and before and after the target address.

When the number of written addresses is greater than ¼ of all addresses, the dither pattern generator 20 does not set the target address as the excluded address regardless of the state of the adjacent addresses of the target address.

In a first embodiment, when the number of target addresses in which a dither value has been written is equal to or smaller than a first number, the dither pattern generator 20 excludes the target address from the addresses for which the spatiotemporal density value is to be obtained, if the number of written addresses is at least a second number. Here, the first number is ⅛ of all addresses, and the second number is 1.

Moreover, when the number of target addresses in which a dither value has been written is greater than the first number and equal to or smaller than a third number, the dither pattern generator 20 excludes the target address from the addresses for which the spatiotemporal density value is to be obtained, if the number of written addresses is at least a fourth number. Here, the third number is ¼ of all addresses, and the fourth number is 2. Note that the fourth number 2 in a first embodiment is two addresses symmetrical with respect to the target address.

The dither pattern generator 20 calculates a spatiotemporal density value of each address in which a dither value is 0 and searches for an address having the smallest spatiotemporal density value in step S14, except for the excluded addresses set in step S13.

In a first embodiment, if a dither value other than the dither value 0 is written in the adjacent address of the target address, since the target address is excluded even if the spatiotemporal density value in the target address in the smallest, the target address will not be selected as the address having the smallest spatiotemporal density value. The process of setting the excluded address in a first embodiment is a process of ultimately processing the target address in which a dither value other than the dither value 0 is written in the adjacent address to be less likely to be selected as an address having the smallest spatiotemporal density value.

The dither pattern generator 20 writes the dither value into the address of the RAM 30 obtained via step S14 in step S15. In step S15, 255 is first written as the dither value. The dither pattern generator 20 increments a count value by 1 in step S16, and determines whether the count value is 8 in step S17. If the count value is not 8 (NO), the dither pattern generator 20 repeats processes of steps S13 through S17.

If the count value is 8 in step S17 (YES), the dither pattern generator 20 resets the counter to set the count value to zero, and decrements the dither value by 1 in step S18. The dither pattern generator 20 determines whether the dither value is 0 in step S19. If the dither value is not 0 (NO), the dither pattern generator 20 repeats the processes of steps S13 through S19.

If the dither value is 0 in step S19 (YES), the dither pattern generator 20 ends the processing.

In FIG. 5, step S13 includes a first process of determining the number of written address or addresses in a three-dimensional area centered on the target address. Step S14 includes a second process of obtaining a spatiotemporal density value indicating the degree of density of the written addresses in a three-dimensional area centered on the target address. The three-dimensional area in step S13 and the three-dimensional area in step S14 may not be the same.

Step S13 includes a third process of processing the target address to be less likely to be selected as an address having the smallest spatiotemporal density value, in accordance with the number of written address or addresses obtained by the first process. Step S14 includes a fourth process of selecting an address having the smallest spatiotemporal density value among all of the target addresses after executing the third process. Step S15 is a fifth process of writing a dither value to the target address selected as the address having the smallest spatiotemporal density value.

The dither pattern generator 20 can set the RAM 30 in a state where eight dither values from the dither value 255 to the dither value 0 are written, by executing a sixth process of repeating steps S13 to S19 including the first to fifth processes, subsequent to steps S11 and S12. Thus, dither data having a three-dimensional dither pattern is stored in the RAM 30.

Second Embodiment

Figure 7:
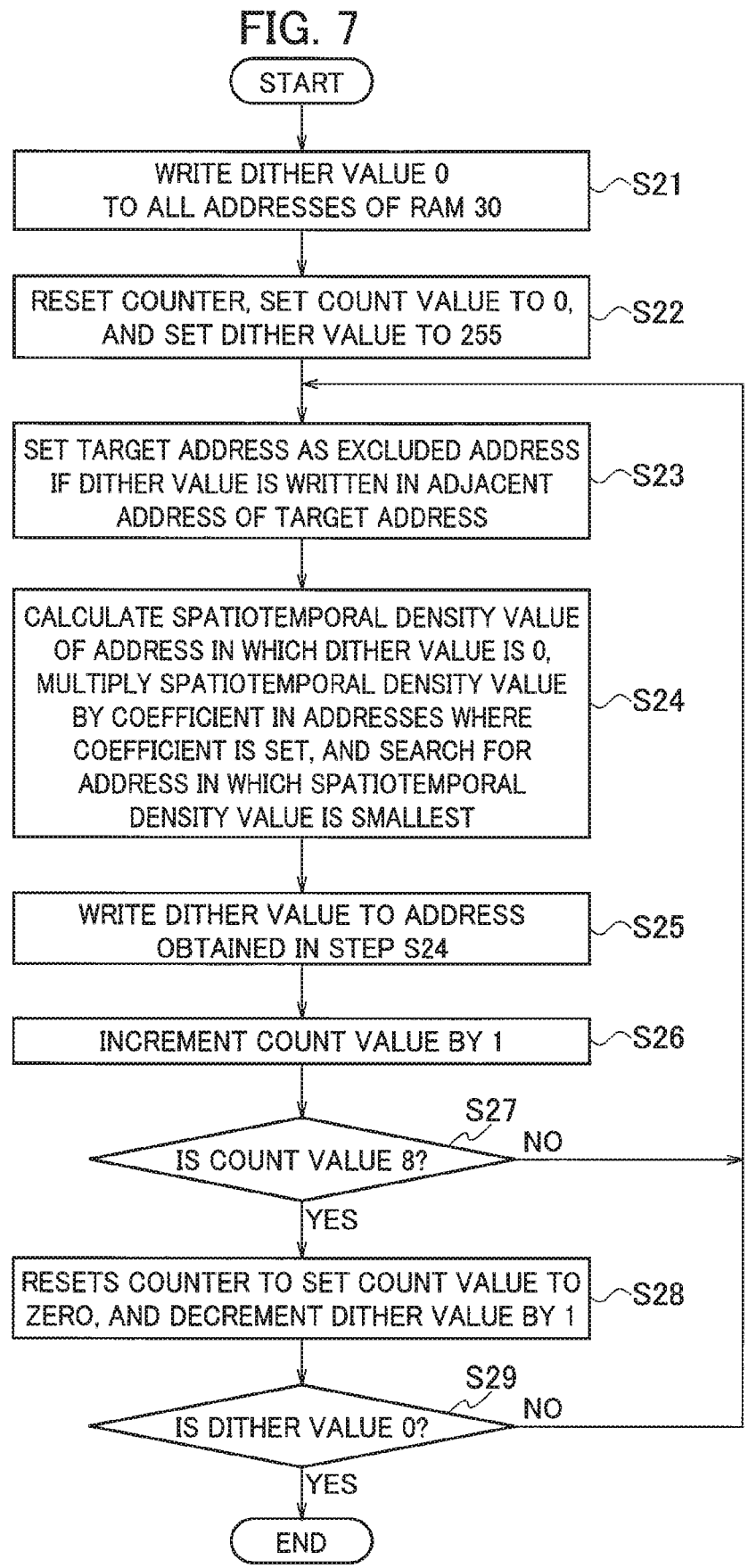
FIG. 7 is a flowchart illustrating processes executed via a dither pattern generating method or a dither pattern generating program according to a second embodiment.

FIG. 7 illustrates processes in which the dither pattern generator 20 generates the dither patterns executing a dither pattern generating method or a dither pattern generating program according to a second embodiment.

In FIG. 7, the dither pattern generator 20 writes a dither value 0 to all 2048 addresses of the RAM 30 in step S21. The dither pattern generator 20 resets a counter to set a count value to 0, and sets a dither value to 255 in step S22.

In step S23, the dither pattern generator 20 sequentially sets each address of 2048 addresses in the RAM as a target address, and sets a predetermined coefficient to the target address, if a dither value other than the dither value 0 is written in the adjacent address of each target address. As shown in FIG. 6, the adjacent address of the target address is an address located to the left, right, above, or below the target address in each of the dither patterns Dp1 to Dp8, or an address before or after adjacent to the frame direction.

Figure 8:
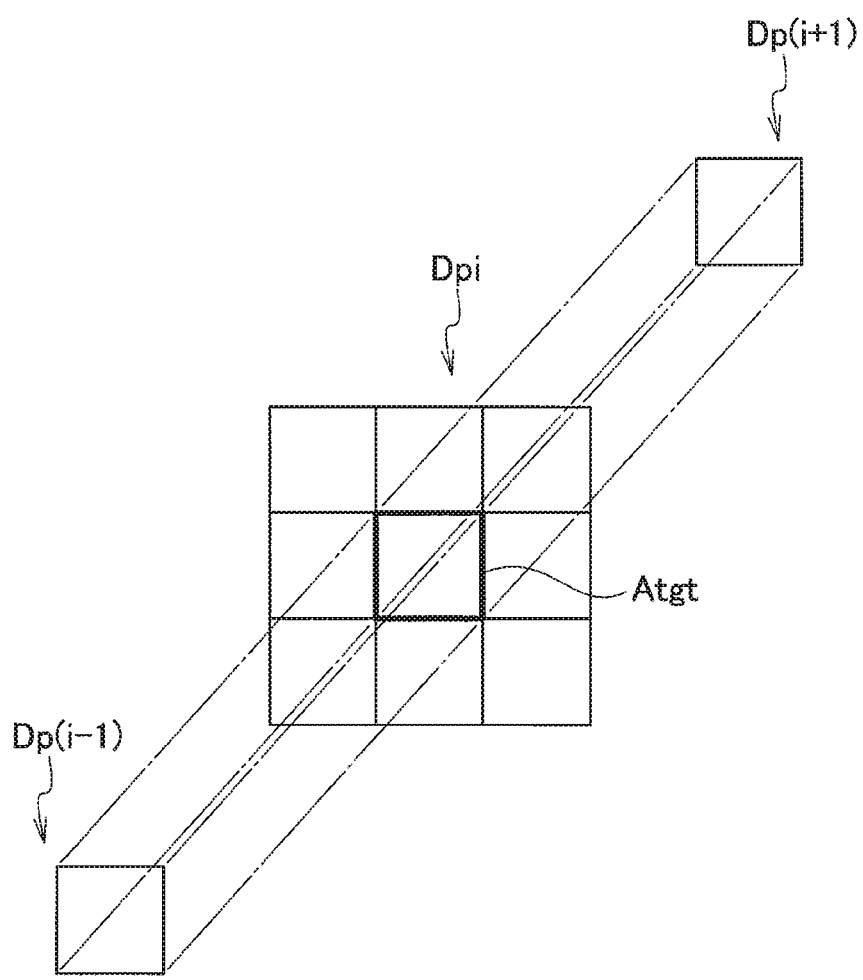
FIG. 8 is a diagram illustrating another example of a three-dimensional area centered on a target address in a second embodiment.

As shown in FIG. 8, an address located in a diagonal direction (upper right, lower right, upper left, or lower left) of the target address may be added to the adjacent address in each of the dither patterns Dp1 to Dp8. In FIG. 8, the left, right, above, below, upper right, lower right, upper left, lower left, before, and after the target address Atgt constitute a predetermined three-dimensional area centered on the target address Atgt.

The dither pattern generator 20 preferably changes the coefficient value of the coefficient set to the target address according to the number of written address or addresses. As an example, when the number of written address or addresses is equal to or smaller than ⅛ of all addresses, the dither pattern generator 20 sets a first coefficient having a first coefficient value to the target address, if a dither value other than the dither value 0 is written even in one of the addresses located to the left, right, above, below, before, and after the target address. The first coefficient value is a number greater than 1 such as 1.1.

In a case where an address located in the diagonal direction of the target address is added to the adjacent address, the dither pattern generator 20 sets a coefficient to the target address, if a dither value other than the dither value 0 is written in the diagonally adjacent address of the target address. The coefficient value at this time is preferably a coefficient value smaller than 1.1.

In addition, when the number of written addresses is greater than ⅛ and equal to or smaller than ¼ of all addresses, the dither pattern generator 20 sets a second coefficient having a second coefficient value to the target address, if a dither value other than the dither value 0 is written in at least one set of addresses located to the left and right, above and below, and before and after the target address. The second coefficient value is a number greater than the first coefficient value such as 1.2.

In a case where an address located in the diagonal direction of the target address is added to the adjacent address, the dither pattern generator 20 sets a coefficient to the target address, if a dither value other than the dither value 0 is written in a set of addresses located to the upper right and lower left, or a set of the lower right and upper left to the target address. The coefficient value at this time is preferably smaller than 1.2 and greater than 1.1.

When the number of written addresses is greater than ¼ of all addresses, the dither pattern generator 20 does not set a coefficient to the target address regardless of the state of the adjacent addresses of the target address.

In a second embodiment, when the number of target addresses in which a dither value has been written is equal to or smaller than a first number, the dither pattern generator 20 sets the first coefficient to the target addresses, if the number of written addresses is at least a second number. Here, the first number is ⅛ of all addresses, and the second number is 1.

Moreover, when the number of target addresses in which a dither value has been written is greater than the first number and equal to or smaller than a third number, the dither pattern generator 20 sets the second coefficient to the target addresses, if the number of written addresses is at least a fourth number. Here, the third number is ¼ of all addresses, and the fourth number is 2. Note that the fourth number 2 in a second embodiment is two addresses symmetrical with respect to the target address.

In step S24, the dither pattern generator 20 calculates a spatiotemporal density value of each address in which a dither value is 0, multiplies the calculated spatiotemporal density value by the coefficient in the addresses where the coefficient is set, and searches for an address having the smallest spatiotemporal density value.

In a second embodiment, if a dither value other than the dither value 0 is written in the adjacent address of the target address, a coefficient having a coefficient value greater than 1 is set to the target address. As a result, the spatiotemporal density value of the target address is multiplied by the coefficient value to increase the coefficient value, and the target address is less likely to be selected as an address having the smallest spatiotemporal density value.

The dither pattern generator 20 writes the dither value into the address of the RAM 30 obtained via step S24 in step S25. The dither pattern generator 20 increments a count value by 1 in step S26, and determines whether the count value is 8 in step S27. If the count value is not 8 (NO), the dither pattern generator 20 repeats processes of steps S23 through S27.

If the count value is 8 in step S27 (YES), the dither pattern generator 20 resets the counter to set the count value to zero, and decrements the dither value by 1 in step S28. The dither pattern generator 20 determines whether the dither value is 0 in step S29. When the dither value is not 0 (NO), the dither pattern generator 20 repeats the processes of steps S23 through S29.

If the dither value is 0 in step S29 (YES), the dither pattern generator 20 ends the processing.

In FIG. 7, step S23 includes a first process of determining the number of written address or addresses in a three-dimensional area centered on the target address. Step S24 includes a second process of obtaining a spatiotemporal density value indicating the degree of density of the written addresses in a three-dimensional area centered on the target address. The three-dimensional area in step S23 and the three-dimensional area in step S24 may not be the same.

Steps S23 and S24 includes a third process of processing the target address to be less likely to be selected as an address having the smallest spatiotemporal density value, in accordance with the number of written address or addresses obtained by the first process. Step S24 includes a fourth process of selecting an address having the smallest spatiotemporal density value among all of the target addresses after executing the third process. Step S25 is a fifth process of writing a dither value to the target address selected as the address having the smallest spatiotemporal density value.

The dither pattern generator 20 can set the RAM 30 in a state where eight dither values from the dither value 255 to the dither value 0 are written, by executing a sixth process of repeating steps S23 to S29 including the first to fifth processes subsequent to steps S21 and S22. Thus, dither data having a three-dimensional dither pattern is stored in the RAM 30.

Third Embodiment

Figure 9:
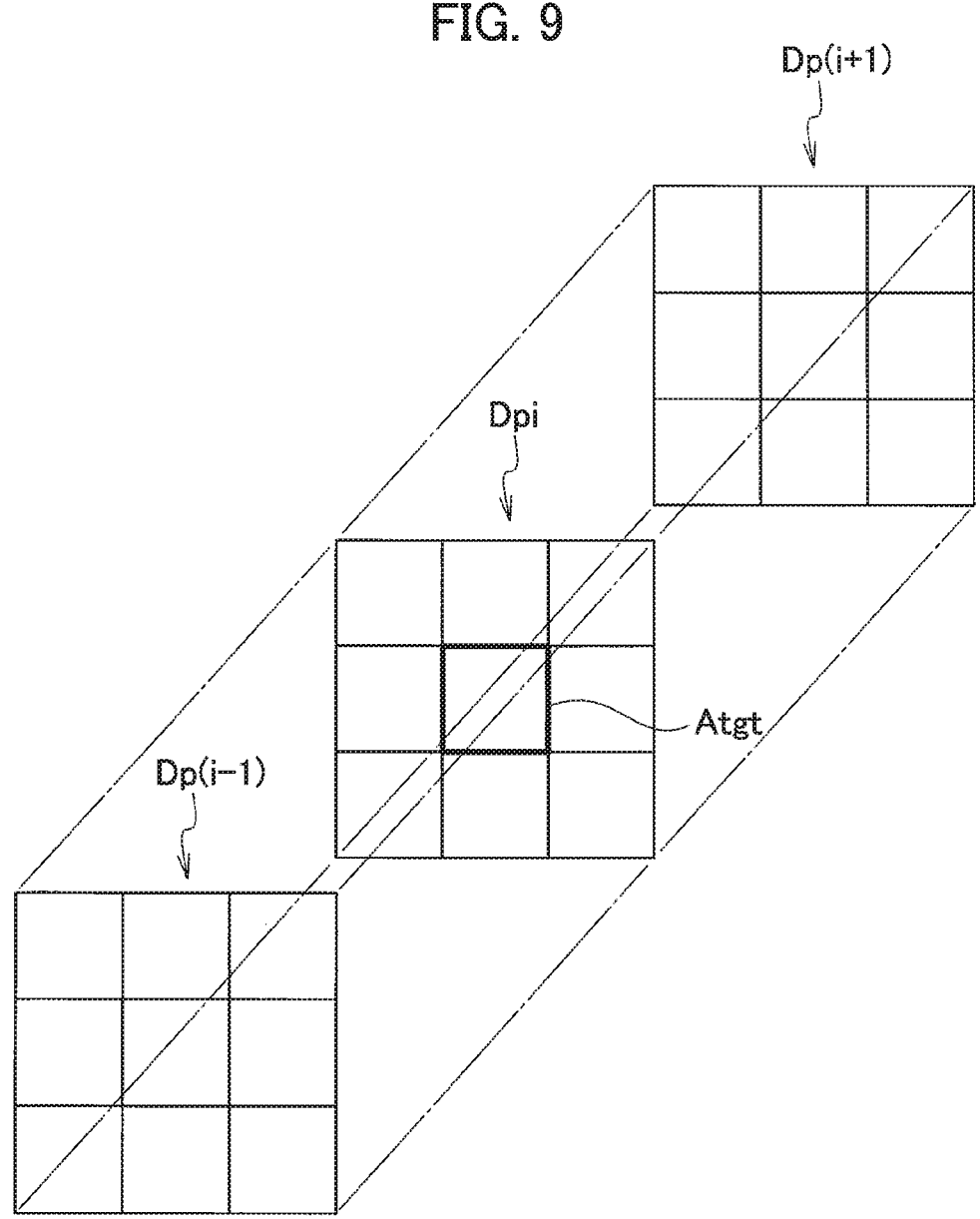
FIG. 9 is a diagram illustrating an example of a three-dimensional area centered on a target address in a third embodiment.

In the above-described first and second embodiments, the adjacent addresses of the target address is defined as shown in FIG. 6 or 8, but may be defined as shown in FIG. 9. In FIG. 9, p×p addresses of p in the horizontal and vertical directions centered on the target address Atgt, and p×p addresses located before and after the target address Atgt adjacent to the frame direction constitute a predetermined three-dimensional area centered on the target address Atgt. p is an integer of 3 or more.

In a third embodiment, as similar to a first embodiment, when the number of target addresses in which the dither value has been written is equal to or smaller than the first number, the dither pattern generator 20 excludes the target address from the addresses for which the spatiotemporal density value is to be obtained, if the number of written addresses is at least a second number. The second number may be appropriately set.

Moreover, when the number of target addresses in which a dither value has been written is greater than the first number and equal to or smaller than the third number, the dither pattern generator 20 excludes the target address from the addresses for which the spatiotemporal density value is to be obtained, if the number of written addresses is at least the fourth number. The fourth number may be appropriately set.

Furthermore, in a third embodiment, as similar to a second embodiment, when the number of target addresses in which the dither value has been written is equal to or smaller than the first number, the dither pattern generator 20 sets the first coefficient to the target addresses, if the number of written addresses is at least a second number. Moreover, when the number of target addresses in which a dither value has been written is greater than the first number and equal to or smaller than the third number, the dither pattern generator 20 sets the second coefficient to the target addresses, if the number of written addresses is at least the fourth number.

The second or fourth number in a third embodiment may not be a set of two addresses located at symmetrical positions across the target address. The number of written addresses at any position among the 26 addresses located around on the target address may be the second or fourth number.

Next, processing of a fourth embodiment that can reduce the amount of calculation in the dither pattern generator 20 will be described.

Fourth Embodiment

In FIG. 10, the dither pattern generator 20 writes a dither value 0 to all 2048 addresses of the RAM 30 in step S41. The dither pattern generator 20 resets a counter to set a count value to 0, and sets a dither value to 255 in step S42.

In step S43, the dither pattern generator 20 calculates a spatiotemporal density value of each address in which a dither value is 0, and searches for an address having the smallest spatiotemporal density value, in the address of the current frame value. The frame value is a count value for selecting any one of the dither patterns Dp1 to Dp8 of eight frame periods.

The dither pattern generator 20 writes the dither value into the address of the RAM 30 obtained via step S43 in step S44. The dither pattern generator 20 increments the frame value by 3 in step S45. The dither pattern generator 20 decrements the frame value by 8, if the frame value incremented by 3 is 8 or more.

The dither pattern generator 20 increments the count value by 1 in step S46, and determines whether the count value is 8 in step S47. If the count value is not 8 (NO), the dither pattern generator 20 repeats the processes of steps S43 through S47.

If the count value is 8 in step S47 (YES), the dither pattern generator 20 resets the counter to set the count value to zero, and decrements the dither value by 1 in step S48. The dither pattern generator 20 determines whether the dither value is 0 in step S49. If the dither value is not 0 (NO), the dither pattern generator 20 repeats the processes of steps S43 through S49.

If the dither value is 0 in step S49 (YES), the dither pattern generator 20 ends the processing.

According to a fourth embodiment shown in FIG. 10, the process of searching for the address with the smallest spatiotemporal density value and the process of writing the dither value to the address with the smallest spatiotemporal density value are executed for each two-dimensional block in the three-dimensional block of the addresses of the RAM 30. Therefore, the operation amount of the process of searching for the address with the smallest spatiotemporal density value is $\frac{1}{8}$.

In the example shown in FIG. 10, the frame value circulates in the order of $0 \to 3 \to 6 \to 1 \to 4 \to 7 \to 2 \to 5 \to 0 \ldots$ over a period of 8 frames. This is taken as a first circulation example. The method of circulating frame values is not limited to the first circulation example. As a second circulation example, the frame value may circulate in the order of $0 \to 5 \to 2 \to 7 \to 4 \to 1 \to 6 \to 3 \to 0 \to \ldots$, or as a third circulation example, the frame value may circulate in the order of $0 \to 1 \to 2 \to 3 \to 4 \to 5 \to 6 \to 7 \to \ldots$. The order of circulating the two-dimensional block in the frame direction may be an arbitrary order.

According to a fourth embodiment, it is possible to generate a dither pattern capable of extending gradation with a high quality with a small amount of calculation, while side effects caused by addition of the dither data is unlikely to occur.

A fourth embodiment may be combined with first to third embodiments. By combining fourth embodiment with first to third embodiments, an advantageous effect to reduce the amount of calculation can be obtained, in addition to the advantageous effect that each dither value can be dispersed more uniformly in one dither pattern and in the frame direction.

The present invention is not limited to first to fourth embodiments described above and various modifications may be made without departing from the scope of the present invention. A first number of bits of an input image signal and a second number of bits of an output image signal are not limited to 12 bits and 4 bits, respectively, and the number of extension bits is also not limited to 8 bits.

The configuration illustrated in FIG. 1 may be constituted by hardware (circuit) or software. The use of hardware and software is arbitrary. The dither pattern generating program is stored in a non-transitory storage medium, loaded in a main memory, and executed by a CPU.

What is claimed is:

1. An image signal processing device comprising:
a storage device configured, when the number of dots in a horizontal direction is H, the number of lines in a vertical direction is V, and the number of frame directions is F, to store dither data having a three-dimensional dither pattern composed of a three-dimensional block in which two-dimensional dither patterns are arranged in the number F in the frame direction, in which the number of dots of H×V is a number exceeding 4, and each two-dimensional block consisting of the number of dots of H×V is set to be one two-dimensional dither pattern, in which a dither value that is one of n bits is set in each dot, n being an integer in which 2 to the n-th power is less than or equal to H×V×F;
an adder configured to add a selected dither pattern for each of the two-dimensional blocks consisting of the number of dots of H×V in a frame of an input image signal having a first number of bits, when the two-dimensional dither patterns in the number F in the frame direction are sequentially selected in a frame period F; and
a lower bit reduction unit configured to perform limit processing on an overflow at an output of the adder, and to output an image signal having a second number of bits obtained by reducing the lower n bits of the first number of bits, wherein
each value from a minimum value to a maximum value of dither values of n bits is written in each address of the storage device corresponding to each dot of the three-dimensional block consisting of the number of dots of H×V×F, and
each value of the dither values of n bits is assigned to each dot of the three-dimensional block by repeating the following processing:
a first processing of obtaining the number of written address or addresses in which a dither value has already been written in a predetermined three-dimensional area centered on each of target addresses in which a new dither value is writable, when each value of the dither values of n bits is written into the storage device;
a second processing of obtaining a spatiotemporal density value indicating a degree of density of the written addresses in the predetermined three-dimensional area centered on each of the target addresses;
a third processing of processing the target address to be less likely to be selected as an address having the smallest spatiotemporal density value, in accordance with the number of written address or addresses obtained by the first processing;
a fourth processing of selecting an address having the smallest spatiotemporal density value among all the target addresses after executing the third processing; and
a fifth processing of writing a dither value to the target address selected as the address having the smallest spatiotemporal density value by the fourth processing.

2. The image signal processing device according to claim 1, wherein the predetermined area in the first processing is an area including at least addresses located to the left, right, above, and below the target address in the two-dimensional dither pattern, and addresses before and after adjacent to the frame direction of the target address.

3. The image signal processing device according to claim 1, wherein the predetermined area is an area including p×p addresses of p in the horizontal direction and p in the vertical direction centered on the target address in the two-dimensional dither pattern, and p×p addresses located before and after the target address adjacent to the frame direction of the target address, where p is an integer of 3 or more.

4. The image signal processing device according to claim 1, wherein the third processing is a processing of excluding the target address from the addresses for which the spatiotemporal density value is to be obtained.

5. The image signal processing device according to claim 4, wherein
when the number of the target addresses in which a dither value has been written is equal to or smaller than a first number of all addresses corresponding to each dot of the three-dimensional block, the target address is excluded from the addresses for which the spatiotemporal density value is to be obtained, if the number of written addresses obtained in the first processing is at least a second number, and
when the number of the target addresses in which a dither value has been written is greater than the first number and equal to or smaller than a third number of all addresses, the target address is excluded from the addresses for which the spatiotemporal density value is to be obtained, if the number of written addresses obtained in the first processing is at least a fourth number greater than the second number.

6. The image signal processing device according to claim 1, wherein the third processing is a processing of multiplying the spatiotemporal density value by a coefficient so as to increase the spatiotemporal density value obtained at the target address.

7. The image signal processing device according to claim 6, wherein
when the number of the target addresses in which a dither value has been written is equal to or smaller than a first number of all addresses corresponding to each dot of the three-dimensional block, the spatiotemporal density value obtained at the target address is multiplied by a first coefficient, if the number of written addresses obtained in the first processing is at least a second number, and
when the number of the target addresses in which a dither value has been written is greater than the first number and equal to or smaller than a third number of all addresses, the spatiotemporal density value obtained at the target address is multiplied by a second coefficient greater than the first coefficient, if the number of written addresses obtained in the first processing is at least a fourth number greater than the second number.

8. A dither pattern generating method of, when the number of dots in a horizontal direction is H, the number of lines in a vertical direction is V, and the number of frame directions is F, generating dither patterns composed of a three-dimensional block in which two-dimensional dither patterns are arranged in the number F in the frame direction, in which the number of dots of H×V is a number exceeding 4, and each two-dimensional block consisting of the number of dots of H×V is set to be one two-dimensional dither pattern, in which a dither value that is one of n bits is set in each dot, n being an integer in which 2 to the n-th power is less than or equal to H×V×F, the dither pattern generating method comprising:
using a processor to obtain the number of written address or addresses in which a dither value has already been written in a predetermined three-dimensional area centered on each of target addresses in which a new dither value is writable, of the addresses in a storage device corresponding to each dot of the three-dimensional block consisting of the number of dots of H×V×F;
using a processor to obtain a spatiotemporal density value indicating a degree of density of the written addresses in the predetermined three-dimensional area centered on each of the target addresses;
using a processor to process each target address to be less likely to be selected as an address having the smallest spatiotemporal density value, in accordance with the obtained number of written address or addresses;
using a processor to select an address having the smallest spatiotemporal density value among all the target addresses, after processing each target address to be less likely to be selected as an address having the smallest spatiotemporal density value;
using a processor to write a dither value to the target address selected as the address having the smallest spatiotemporal density value; and
using a processor to store dither data having the three-dimensional dither pattern in the storage device, by writing each value from a minimum value to a maximum value of dither values of n bits in an arbitrary order in each address of the storage device corresponding to each dot of the three-dimensional block, by repeating the obtaining of the number of written address or addresses, the obtaining of the spatiotemporal density value, the processing of each target address to be less likely to be selected as an address having the smallest spatiotemporal density value, the selecting of an address having the smallest spatiotemporal density value, and the writing of a dither value to the target address selected as the address having the smallest spatiotemporal density value.

9. A computer software product that includes a non-transitory storage medium readable by a processor, the non-transitory storage medium having stored thereon a set of instructions for generating dither patterns, when the number of dots in a horizontal direction is H, the number of lines in a vertical direction is V, and the number of frame directions is F, generating dither patterns composed of a three-dimensional block in which two-dimensional dither patterns are arranged in the number F in the frame direction, in which the number of dots of H×V is a number exceeding 4, and each two-dimensional block consisting of the number of dots of H×V is set to be one two-dimensional dither pattern, in which a dither value that is one of n bits is set in each dot, n being an integer in which 2 to the power is less than or equal to H×V×F, the instructions comprising:
a first set of instructions of obtaining the number of written address or addresses in which a dither value has already been written in a predetermined three-dimensional area centered on each of target addresses in which a new dither value is writable, of the addresses in a storage device corresponding to each dot of the three-dimensional block consisting of the number of dots of H×V×F;
a second set of instructions of obtaining a spatiotemporal density value indicating a degree of density of the written addresses in the predetermined three-dimensional area centered on each of the target addresses;
a third set of instructions of processing each target address to be less likely to be selected as an address having the smallest spatiotemporal density value, in accordance with the number of written address or addresses obtained by the first set of instructions;

a fourth set of instructions of selecting an address having the smallest spatiotemporal density value among all the target addresses after executing the third set of instructions; and a fifth set of instructions of writing a dither value to the target address selected as the address having the smallest spatiotemporal density value by the fourth set of instructions; and a sixth set of instructions of storing dither data having the three-dimensional dither pattern in the storage device, by writing each value from a minimum value to a maximum value of dither values of n bits in an arbitrary order in each address of the storage device corresponding to each dot of the three-dimensional block, by repeating the first to fifth sets of instructions.

10. An image signal processing device comprising:

a storage device configured, when the number of dots in a horizontal direction is H, the number of lines in a vertical direction is V, and the number of frame directions is F, to store dither data having a three-dimensional dither pattern composed of a three-dimensional block in which two-dimensional dither patterns are arranged in the number F in the frame direction, in which the number of dots of H×V is a number exceeding 4, and each two-dimensional block consisting of the number of dots of H×V is set to be one two-dimensional dither pattern, in which a dither value that is one of n bits is set in each dot, n being an integer in which 2 to the n-th power is less than or equal to H×V×F;

an adder configured to add a selected dither pattern for each of the two-dimensional blocks consisting of the number of dots of H×V in a frame of an input image signal having a first number of bits, when the two-dimensional dither patterns in the number F in the frame direction are sequentially selected in a frame period F; and a lower bit reduction unit configured to perform limit processing on an overflow at an output of the adder, and to output an image signal having a second number of bits obtained by reducing the lower n bits of the first number of bits, wherein each value from a minimum value to a maximum value of dither values of n bits is written in each address of the storage device corresponding to each dot of the three-dimensional block consisting of the number of dots of H×V×F, when each value of the dither values of n bits is written into the storage device, a processing of obtaining a spatiotemporal density value indicating a degree of density of written addresses in which a dither value has already been written in a predetermined three-dimensional area centered on each of target addresses in which a new dither value is writable, and a processing of selecting an address having the smallest spatiotemporal density value among the addresses in which a new dither value is writable and writing a dither value are executed for each two-dimensional block of the three-dimensional block, each value of the dither values of n bits is assigned to each dot of the three-dimensional block by circulating a two-dimensional block in which the processing of obtaining a spatiotemporal density value and the processing of selecting an address having the smallest spatiotemporal density value and writing a dither value are executed, in the frame direction in an arbitrary order.

11. A dither pattern generating method of, when the number of dots in a horizontal direction is H, the number of lines in a vertical direction is V, and the number of frame directions is F, generating dither patterns composed of a three-dimensional block in which two-dimensional dither patterns are arranged in the number F in the frame direction, in which the number of dots of H×V is a number exceeding 4, and each two-dimensional block consisting of the number of dots of H×V is set to be one two-dimensional dither pattern, in which a dither value that is one of n bits is set in each dot, n being an integer in which 2 to the n-th power is less than or equal to H×V×F, the dither pattern generating method comprising:

using a processor to obtain a spatiotemporal density value indicating a degree of density of written addresses in which a dither value has already been written in a predetermined three-dimensional area centered on each of target addresses in which a new dither value is writable, for each two-dimensional block of the three-dimensional block;

using a processor to select an address having the smallest spatiotemporal density value among the addresses in which a new dither value is writable, and writing a dither value to the selected address, for each two-dimensional block of the three-dimensional block; and using a processor so store dither data having the three-dimensional dither pattern in the storage device, by writing each value from a minimum value to a maximum value of dither values of n bits in an arbitrary order in each address of the storage device corresponding to each dot of the three-dimensional block, by circulating a two-dimensional block in which the processing of obtaining a spatiotemporal density value and the processing of selecting an address having the smallest spatiotemporal density value and writing a dither value are executed, in the frame direction in an arbitrary order.

12. A computer software product that includes a non-transitory storage medium readable by a processor, the non-transitory storage medium having stored thereon a set of instructions for generating dither patterns, when the number of dots in a horizontal direction is H, the number of lines in a vertical direction is V, and the number of frame directions is F, generating dither patterns composed of a three-dimensional block in which two-dimensional dither patterns are arranged in the number F in the frame direction, in which the number of dots of H×V is a number exceeding 4, and each two-dimensional block consisting of the number of dots of H×V is set to be one two-dimensional dither pattern, in which a dither value that is one of n bits is set in each dot, n being an integer in which 2 so the n-th power is less than or equal to H×V×F, the instructions comprising:

a first set of instructions of obtaining a spatiotemporal density value indicating a degree of density of written addresses in which a dither value has already been written in a predetermined three-dimensional area centered on each of target addresses in which a new dither value is writable, for each two-dimensional block of the three-dimensional block;

a second set of instructions of selecting an address having the smallest spatiotemporal density value among the addresses in which a new dither value is writable, and writing a dither value to the selected address, for each two-dimensional block of the three-dimensional block; and a third set of instructions of storing dither data having the three-dimensional dither pattern in the storage device, by writing each value from a minimum value to a maximum value of dither values of n bits in an arbitrary order in each address of the storage device corresponding to each dot of the three-dimensional block, by circulating a two-dimensional block in which the processing of obtaining a spatiotemporal density value and the processing of selecting an address having the smallest spatiotemporal density value and writing a dither value are executed, in the frame direction in an arbitrary order.

* * * * *